Feb. 9, 1971     H. BEUTELSPACHER     3,561,871
ULTRACENTRIFUGE FOR ANALYTICAL PURPOSES
Filed May 13, 1968
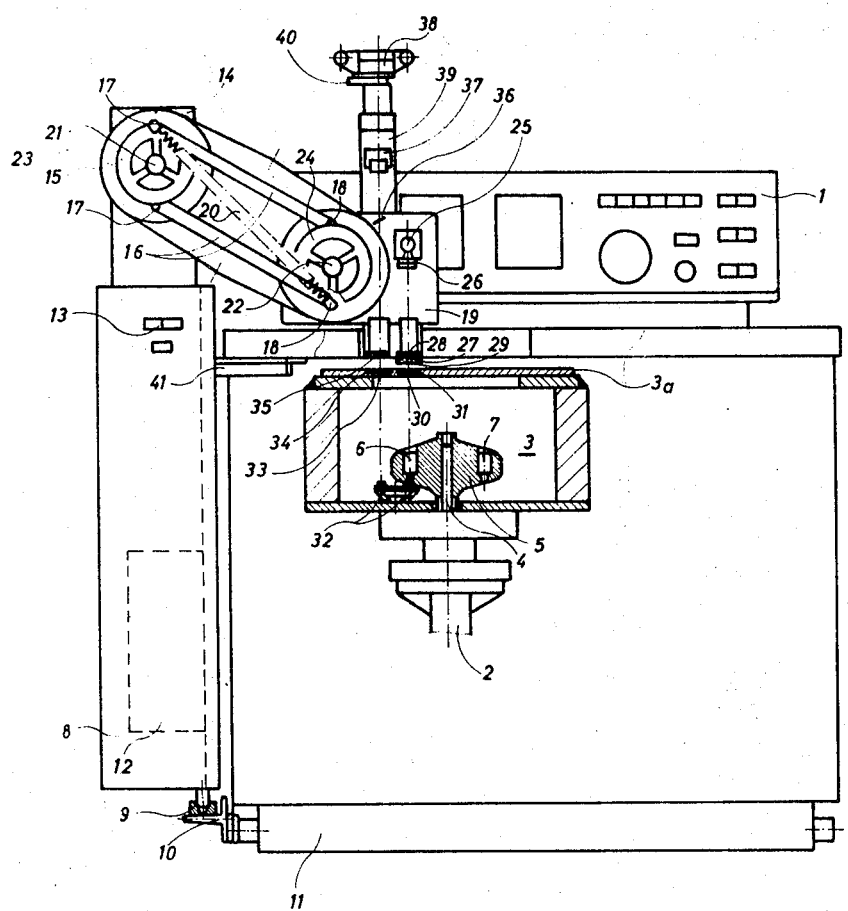
Inventor
Hans Beutelspacher
By Burgess Dinklage & Sprung United States Patent Office 3,561,871
Patented Feb. 9, 1971

1

3,561,871
ULTRACENTRIFUGE FOR ANALYTICAL
PURPOSES
Hans Beutelspacher, Braunschweig, Germany, assignor to
Heraeus-Christ G.m.b.H., Osterode, Harz, Germany
Filed May 13, 1968, Ser. No. 728,538
Claims priority, application Germany, May 17, 1967,
C 42,364
Int. Cl. G01n 21/00, 21/06
U.S. Cl. 356—72                    3 Claims

ABSTRACT OF THE DISCLOSURE

An ultracentrifuge which is provided with an optical system with a very short beam path for carrying out analytical observations. This optical system takes up a very small space and may be designed as a separate unit which may be attached to a normal ultracentrifuge which only requires simple alterations for the additional analytical purposes.

---

The present invention relates to an ultracentrifuge for analytical purposes which is provided with an optical system including a light source and recording and/or observation means, and with a paraxial beam path through the vacuum chamber.

In ultracentrifuges of this kind as have heretofore been designed, the beam path extends through the centrifuge chamber and is thereafter passed into the image-forming system. Generally, this requires a reflecting mirror above and below the centrifuge. Since the centrifuge chamber must be removable from the housing of the apparatus, the optical system must be located outside of the area which is required for the removability of the chamber. This, in turn, requires the optical system to have a large focal length and thus also a great total length.

It is an object of the present invention to provide an ultracentrifuge for analytical purposes which only requires an extremely short beam path and therefore permits the apparatus to be made of considerably smaller dimensions than those of similar apparatus as heretofore designed.

A feature of the invention for attaining this object consists in providing on the bottom of the vacuum chamber a reflector arrangement for reflecting the light beam about an angle of 180° so that two beam paths are formed and in providing the cover of the vacuum chamber with two windows which are spaced from each other approximately at a distance equal to the distance between these beam paths.

According to another feature of the invention, the beam-emitting system and the image-forming system are preferably provided with parallel axes which are spaced from each other at a distance equal to the distance of the beam paths in the vacuum chamber. This has the important advantage that the beam-emitting and image-forming systems may be combined within a common housing.

Another feature of the invention consists in designing this additional housing of the analyzing apparatus to be removable from or pivotable relative to the main centrifuge housing so as to permit free access to the vacuum chamber when the latter is to be removed from the main housing of the centrifuge.

For the last-mentioned purpose, the invention provides that this additional housing is mounted on pivotable arms which preferably form a parallelogram. This permits the additional housing to be moved vertically as closely as possible to the windows of the vacuum chamber and thereby it permits the required focal length of the lens to be made of a very small size. This manner of mounting the additional housing on pivotable arms has the further advantage that the housing may be easily pivoted out of the area which is required in order to permit the vacuum chamber to be easily removed from the main housing of the ultracentrifuge.

It is another important object of the present invention to supplement or convert a normal treating ultracenrifuge without any extensive reconstruction so as also to permit it to be employed for carrying out analytical work. For this purpose, the invention provides the housing of the analyzing apparatus to be pivotably suspended on a further housing element which is removably secured to the centrifuge housing. Such a removable housing element may be easily installed at any time and with simple structural means to an existing ultracentrifuge of a normal construction.

For attaining this object it is further advisable to provide a chamber within the further housing element in which the necessary means for the operation of the optical system are located so that the analysing apparatus which may be subsequently installed may be supplied as a self-contained structural unit which includes all of the elements which are required for analysing operations.

The present invention therefore permits the production of an inexpensive machine of the type as described which either comprises a conventional ultracentrifuge which is supplemented in a very simple manner and by inexpensive means so as to have a component for also carrying out analytical work or which may be originally designed for treating materials as well as for analysing them.

The features and advantages of the present invention will become further apparent from the following detailed description which is to be read with reference to the accompanying diagrammatic drawing.

This drawing illustrates a normal treating ultracentrifuge 1 which is substantially of a known construction and equipped with additional means according to the invention for carrying out analytical work. The conventional centrifuge is provided in the usual manner with a drive 2, an armor-plated vacuum chamber 3, and a hermetically sealing stuffing box 4. The vacuum chamber 3 is enclosed on its upper side by a cover 3a. The rotor 5 of the centrifuge is provided in the usual manner with a specimen chamber 6 and a balancing chamber 7.

In order to prevent the drawing from being unduly complex and to permit the present invention to be more clearly illustrated, certain conventional elements of the ultracentrifuge are omitted, for example, a vacuum pump, a diffusion pump, a cooling unit and control means for maintaining a constant rotor temperature, means for moving the heavy armor-plated cover 3a, and details about the control knobs and indicating instruments of the centrifuge itself as well as of the analysing apparatus.

The supplementary unit according to the invention for carrying out analytical work comprises a housing 8 the lower end of which is supported on a pair of bearings 9 on a T-rail 10 which is secured to the base 11 of the main housing of the centrifuge. Housing 8 contains a chamber in which the main current-supply unit 12 for the high-pressure mercury vapor lamp 26 is mounted, and this housing may be further provided with a pilot screen 13 for this lamp 26 and control knobs for switching the lamp on and off.

On its upper end, housing 8 has a box-shaped extension 14 on the opposite outer sides of which two parallelogram units are pivotably mounted each of which consists of a pair of arms 16 which are pivotably mounted at their opposite ends on bearing members 17 and 18. These parallelogram units are enclosed within two oval box-shaped covers 15. The bearing members 18 are mounted on a further housing 19 which contains the beam-emitting and image-forming systems.

The combined parallelogram units 16 permit the housing 19 to be easily raised and lowered and to be maintained at all times in a vertical position. A weight compensation is attained by the provision of coil springs 20 so that the housing 19 will automatically remain in the position to which it is adjusted.

The covers 15 containing the parallelogram-shaped arms 16 are pivotably mounted on shafts 21 and 22 which are secured to the housing extension 14 and the housing 19, respectively. The ends of these shafts are provided with screw threads upon which handwheels 23 and 24 are screwed by means of which the two parallelogram units 16 including their covers 15 may be pressed together so as to form a single rigid element.

Housing 19 contains the beam-emitting and image-forming systems. The beam-emitting system comprises the high-pressure mercury vapor lamp 25 the housing of which has a bilateral slot 26, and it further comprises a first schlieren lens 27, a diaphragm 28, and a filter 29.

The cover 3a of the vacuum chamber contains two windows 31 and 34 which are radially spaced from each other, consist of plane parallel plates of glass or quartz, and are hermetically secured to the cover 3a.

The bottom of the vacuum chamber 3 carries a reflector arrangement which consists of two mirrors 32 or an arrangement of prisms. After passing through the specimen in chamber 6, the light beam 31 is deflected twice about an angle of 90° by the reflector or prism arrangement so that the emerging beam 33 passes through the window 34 in a direction parallel to the entering beam 31 and then hits upon the image-forming objective 35 of the image-forming system which is of the usual construction and comprises a schlieren diaphragm 36 and a cylindrical lens 37. The observation apparatus consists in this particular embodiment of the invention of a reflex camera with an image plane 38 and a reflex adapter 40. The optical attachment 39 may, however, also be of any other conventional design in accordance with the particular requirements.

As may be seen from the above description and from the drawing, the optical axes of the beam-emitting system and the image-forming system extend parallel to each other and are spaced from each other at a distance which is determined by the reflector arrangement 32 in the vacuum chamber 3. In this manner it is possible to attain an optical unit of a very compact construction which takes up a very small space within the housing 19. Only due to this compactness of the optical unit which also be of any other conventional design in accordance an immovable position relative to each other, it is possible to mount the entire optical system so as to be pivotable relative to the ultracentrifuge.

The high-tension line for the mercury-vapor lamps and the lines for the cooling water are not indicated in the drawing. They extend through the oval box-shaped covers 15. Also not shown in the drawing are the means which permit the lamp to be exchanged while the centrifuge is running and the cooling water is flowing. The cooling water is for this purpose passed by a valve arrangement through a by-pass past the lamp housing so that the latter in which the cooling water flows directly around the lamp may be opened without danger that any amount of water worth mentioning will flow out. The cooling water is automatically redirected and the lamp is automatically switched off as soon as a flap in the housing 19 is opened through which the lamp alone is accessible. The cooling water also continues to flow through the by-pass when the lamp is switched off so as to prevent as much as possible any dirt from the water from being deposited within the lamp housing.

By exchanging the light source for another of a suitable type and by exchanging the glass lenses for suitable lenses of quartz, the supplemental apparatus according to the invention may also be employed for working within the ultraviolet range.

For installing and operating the supplemental analysing apparatus it is only necessary to carry out the following changes on an existing centrifuge: First, exchange the cover 3a of the vacuum chamber by one with apertures 30 and 33 and with vacuum-tight windows 31; second, to mount a suitable support carrying the mirrors 32 on the bottom of the rotor chamber 3; third, to bolt the supporting rail 10 on the housing base 11 and to screw the supporting bolts 41 to the main housing; and fourth, to connect a hose to the return outlet of the cooling-water line of the centrifuge.

Any normal ultracentrifuge of the type as previously described may thus be supplemented in a very simple and inexpensive manner so as also to be employed for analysing purposes. If, however, a centrifuge is originally designed for treating operations as well as for analysing purposes, certain structural changes may of course be made without departing from the scope of the invention, especially insofar as the current supply elements for the optical system may be installed within the main housing of the centrifuge.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. An ultracentrifuge adapted for treating operations and analytical work comprising
    (a) a first housing containing a vacuum chamber, a rotor rotatable within said vacuum chamber and having means for holding a specimen to be treated, and means for driving said rotor, said vacuum chamber having a bottom and removable cover, and analyzing means comprising reflecting means fixedly mounted on said bottom within said vacuum chamber, said removable cover having a pair of windows laterally spaced from each other,
    (b) a second housing disposed above said first housing including an optical system having a light source and an image forming means, said light source being adapted to project a beam of light in one direction through a first of said windows and into said chamber and through said specimen and said rotor,
    (c) said reflecting means being positioned to receive the beam of light issuing from the rotor, and adapted to reflect said light beam to the opposite direction and through the second window to said image-forming means,
    (d) a third housing containing current supply and control elements for said light source, mounted on one side of said first housing, and including an extension disposed above said first housing to serve as a supporting element for said second housing,
    (e) connecting means interconnecting said second housing and the supporting element of the third housing, said connecting means permitting moving the second housing from a position for operation of the optical system as aforesaid to a relatively elevated position out of the way of access to the vacuum chamber, said connecting system including guide means for guiding said second housing while being moved as aforesaid without altering the vertical position of said axes.

2. An ultracentrifuge as defined in claim 1, in which said second and third housing form a unit detachably mounted on said first housing.

3. An ultracentrifuge as defined in claim 1, wherein said guide means comprise a plurality of arms pivotably connected to each other so as to form at least one parallelogram-shaped unit, and means for pivotably connecting said unit near its opposite ends to said first and second housings.

References Cited
UNITED STATES PATENTS

| | | | |
|---|---|---|---|
| 2,885,188 | 5/1959 | Pickels et al. | 356—201X |
| 1,907,803 | 5/1933 | Harvey et al. | 356—72X |

RONALD L. WIBERT, Primary Examiner

C. CLARK, Assistant Examiner

U.S. Cl. X.R.

356—201

PO-1050
(5/69)

UNITED STATES PATENT OFFICE
CERTIFICATE OF CORRECTION

Patent No. 3,561,871          Dated Feb. 9, 1971

Inventor(s) Hans Beutlspacher

It is certified that error appears in the above-identified patent and that said Letters Patent are hereby corrected as shown below:

Col. 3, line 60, cancel "be of any other conventional design in accordance" and substitute therefor --permits the optical axes to be easily maintained in--.

Signed and sealed this 13th day of July 1971.

(SEAL)
Attest:

EDWARD M. FLETCHER, JR.
Attesting Officer

WILLIAM E. SCHUYLER, JR.
Commissioner of Patents